United States Patent [19]

Omeis et al.

[11] Patent Number: 5,489,451
[45] Date of Patent: Feb. 6, 1996

[54] REVERSIBLY CROSSLINKED ORIENTABLE LIQUID CRYSTALLINE POLYMERS

[75] Inventors: Jürgen Omeis, Bickenbach; Joachim Knebel, Darmstadt; Karlheniz Goll, Zwingenberg, all of Germany

[73] Assignee: Roehm GmbH Chemische Fabrik, Darmstadt, Germany

[21] Appl. No.: 982,976

[22] Filed: Nov. 30, 1992

[30] Foreign Application Priority Data

Nov. 30, 1991 [DE] Germany .................. 41 39 563.8

[51] Int. Cl.⁶ .................. C09K 19/00; B32B 27/30; C11D 9/00; G11C 13/04
[52] U.S. Cl. .................. 428/1; 252/299.01; 252/299.61; 252/299.5; 365/108; 359/96; 428/522; 428/910; 428/913
[58] Field of Search .................. 428/1, 522, 900, 428/913; 252/299.01, 299.61, 299.5; 365/108; 359/96

[56] References Cited

U.S. PATENT DOCUMENTS

| 4,837,745 | 6/1989 | Eich et al. ........................ 365/108 |
| 4,896,292 | 1/1990 | Eich et al. ........................ 365/108 |

FOREIGN PATENT DOCUMENTS

| 0043904 | 1/1982 | European Pat. Off. . |
| 055838 | 7/1982 | European Pat. Off. . |
| 065869 | 12/1982 | European Pat. Off. . |
| 0231857 | 8/1987 | European Pat. Off. . |
| 0231856 | 8/1987 | European Pat. Off. . |
| 0231858 | 8/1987 | European Pat. Off. . |
| 0410205 | 1/1991 | European Pat. Off. . |
| 0446717 | 9/1991 | European Pat. Off. . |
| 3623395A1 | 1/1988 | Germany . |
| 3825066A1 | 1/1990 | Germany . |
| 3924554A1 | 1/1991 | Germany . |
| 4104319A1 | 8/1992 | Germany . |

OTHER PUBLICATIONS

Database WPIL, Derwent Publications Ltd., AN 87–126322, JP–A–62 068 809, Mar. 28, 1987, "Resin Composition Coating Optical Fibre Cure Resin Polymerise Double Bond Component Liquid Crystal Properties".

*Primary Examiner*—L. Kiliman
*Attorney, Agent, or Firm*—Oblon, Spivak, McClelland, Maier, & Neustadt

[57] ABSTRACT

The invention relates to reversibly crosslinked, orientable liquid crystalline (LC) polymer films, comprised of an LC poly(meth)acrylate PP and/or a mixture of PP with low molecular weight crosslinking components. The inventive films have numerous applications, e.g. for optical information storage, and for surface coatings, laminates, or bonded systems having special anisotropic properties.

36 Claims, No Drawings

REVERSIBLY CROSSLINKED ORIENTABLE LIQUID CRYSTALLINE POLYMERS

BACKGROUND OF THE INVENTION

1. Field of the Invention

The invention relates to reversible, crosslinked, orientable liquid crystalline (LC) polymers based on LC poly(meth)acrylates PP, which are suitable for optical data storage, or for coatings or laminations with special anisotropic optical properties, wherein the poly(meth)acrylate can be the substrate of a self-supporting film or foil usable for special optical applications and a method of manufacturing the same.

2. Background of the Invention

In the area of information storage, LC polymers are of great interest (see Allen, G., and Bevington, J., 1989, "Comprehensive Polymer science", V. 5, pub. Pergamon Press, pp. 701–732). Anisotropic, thin LC polymer films may be oriented using various methods, thereby converting them to LC monodomains. This orientation can be accomplished, e.g., by:

electromagnetic fields (see EP 0,231,856=U.S. Pat. No. 4,886,718; EP 0,231,857=U.S. Pat. No. 4,837,745; and EP 0,231,858=U.S. Pat. No. 4,896,292);

surface effects (DE 38 25 066);

mechanical deformation (see Finkelmann, H., and Hammerschmidt, K., 1989, *Makromolo Chem.*, 190, 1089–1101).

In general the macroscopic orientation is carried out at a temperature range between the glass temperature ($T_g$) and the clear temperature ($T_n$i) of the polymer. In the case of LC side chain polymers the temperatures at which orientation is carried out are near the clear temperature.

EP 0,410,205 describes a method of manufacturing self-supporting anisotropic LC polymer films based on photo-crosslinked poly(meth) acrylates. These films are suitable for, e.g., optical data storage. The anisotropic LC polymer film can be converted to a macroscopically oriented anisotropic state by mechanical deformation, without a support material.

However, in orienting anisotropic, thin LC polymer films by electromagnetic fields or by surface effects, one is limited to structured support materials and specific film thicknesses. According to DE 38 25 066, films which are 1–2 μm thick can be oriented without problems. However, these methods come up against operable limits at a film thicknesses above 10 μm. Films of thickness >10 μm are prepared as a rule by the "display" technology, which involves substantial thermal stress on the polymers. A third method is mechanical deformation (i.e. shear stressing, stretching, and compressing) which is used for orienting LC main chain polymers and crosslinked LC polymers (see Zentel, R., Finkelmann, H., et al., in Gordon, M., Ed., 1984, "Advances in polymer science", V. 60/61, pub. Springer Verlag, of Heidelberg, pp. 155–162; and Finkelmann, H., et al., 1987, *Mol. Cryst. Liq. Cryst.*, 142, 85–100).

Orientation of LC elastomers is carried out, in a manner analogous to that of linear side chain polymers, below the clear temperature $T_n$i (the temperature for transition from nematic to isotropic phase) in the rubberelastic state, and is frozen-in below the glass temperature $T_g$. Because crosslinked LC elastomers, such as polysiloxanes (other than the cyclic tri- and tetra-monomers), have very low glass temperatures, substantially below room temperature, the orientation is preserved only under stressing or at low temperatures below the $T_g$ of the elastomer.

EP 0,410,205 describes a method of manufacturing LC poly(meth)acrylates with incorporated photo-crosslinking groups, and the use of such polymers for manufacturing anisotropic LC selfsupporting polymer films, as well as applications of such films. These films are formed from an organic solvent, which must be disposed of, and the films are irreversibly crosslinked, and are no longer thermoplastic.

Accordingly, the problem of devising reversibly crosslinkable LC polymers which can be thermoplastically processed in the non-crosslinked state, oriented by means of known methods, and which at below certain temperatures, can form self-supporting crosslinked LC polymer films remains.

SUMMARY OF THE INVENTION

Accordingly, one object of this invention is to provide a novel reversible, crosslinked orientable liquid crystalline (LC) polymer by employing LC poly(meth)acrylic acid esters which have incorporated comonomers which have thermoreversibly crosslinkable groups.

Another object of this invention is to provide a method of manufacturing an anisotropic LC polymer film.

Thus the present invention relates to an anisotropic LC polymer film comprised of a reversibly crosslinked LC poly(meth)acrylic acid ester (hereinbelow, "poly(meth)acrylate") PP. The invention also relates to a method of manufacturing anisotropic LC polymer films, particularly self-supporting such films, and the use of such films, particularly in optical data processing of nonlinear optics (NLO), for holography and for manufacturing of optical components, wherewith reversibly crosslinkable LC poly(meth)acrylates PP, or reversibly crosslinkable mixtures comprising:

poly(meth)acrylates PP and low molecular weight crosslinking components, are used as the polymer material.

DETAILED DESCRIPTION OF THE PREFERRED EMBODIMENTS

The liquid crystalline poly(meth)acrylates PP:

As monomeric units for the LC poly(meth)acrylate PP, preferably are monomers of formula III

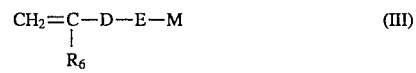

(III)

wherein $R_6$ represents hydrogen or methyl;

D represents a —COO— group or a group

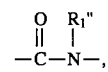

where $R_1''$ represents hydrogen or an $C_{1-4}$ alkyl group;

E represents a spacer unit, preferably comprised of a flexible chain of —$(CH_2)_n$—, where n=1–14, preferably 2–12, wherein individual chain members may have substituents, e.g. $C_{1-4}$ alkyl groups or halogens (such as F, Cl, Br, or I, preferably F or Cl), or wherein individual chain members may be replaced by an ether linkage or a phenylene group; and M represents a mesogenic group.

The monomeric units (III) are preferably used in amounts of 85–99.9 mol %, particularly preferably 90–99 mol %, in the manufacture of the LC poly(meth)acrylates PP. Also, other known members of the group of monomers with mesogenic groups may be used, in amounts of 0–50 mol %.

The production of the monomers of formula III is carried out in essentially known fashion or on the basis of known methods (see DE 36 23 395).

A description of suitable mesogenic groups is found, e.g., in Kelker and Hatz, 1989, "Handbook of Liquid Crystals", pub. Verlag Chemie, pp. 67–113. Preferably the mesogenic group M is represented by formula IV

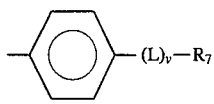
IV where L represents a bridge consisting of one of the following groups

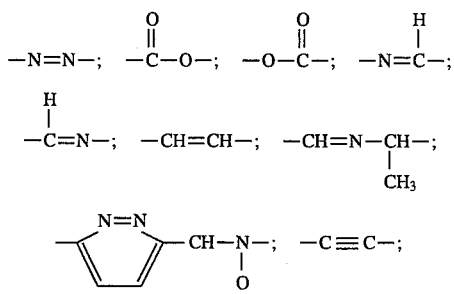

$v=0$ or 1;

$R_7$ is a group

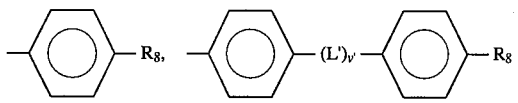

or when $v=$zero, $R_7$ may represent

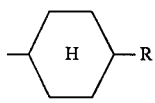

where L' has the same meaning as L, and

V' has the same meaning as v; and $R_8$ represents hydrogen, $-(O)_{s'}$, $-(CH_2)_t-H$, CN, or halogen (particularly fluorine, chlorine, or bromine), $S'=0$ or 1, and $t=$an integer from 1 to 8, particularly from 1 to 6.

Particularly suitable monomers of formula III where M represents the following mesogenic groups:

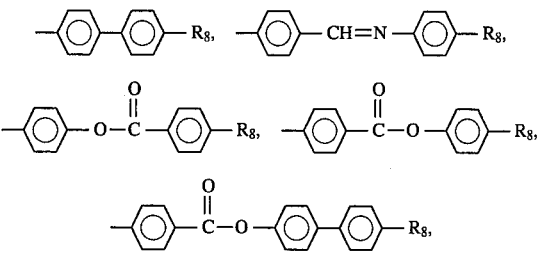

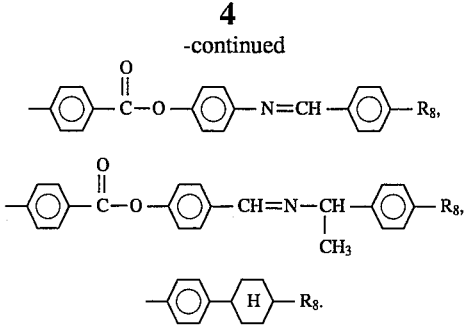

In a preferred embodiment of the invention, M represents a color-conferring structural element, such as a dye moiety F. The mesogenic monomeric units in the polymer, which units contain the dye F, may comprise 0–100 mol %, preferably 10–95 mol %, of the monomer units in the polymer. Preferably the dye F undergoes a change in its molecular geometry, when exposed to light, even at a wavelength different from $\lambda_{max}$ for the dye. Certain additional criteria are applicable which were developed for dyes intended for use in LC systems (see Constant, J., et al., 1978, J. Phys. D. Appl. Phys., II, 479 ff.; Jones, F., and Reeve, T. J., 1980, Mol. Cryst. Liq. Cryst., 60, 99 ff.; EP 0,043,904 (U.S. Pat. No. 4,395,350); EP 0,055,838 (U.S. Pat. No. 4,426,312); and EP 0,065,869). Thus, these dyes should not ionize in an electric field, and they should have maximally high molecular extinction coefficients. In general the absorption maxima of suitable dyes F are in the wavelength range 300–1,000 μm. Preferably the dye F contains at least one structural element which undergoes a change in its geometry under a defined light effect.

Such structural elements may contain, e.g., multiple bonds, which, in particular, can undergo cis-trans isomerism. Such structural elements may also or alternatively contain other isomerizable systems, e.g. based on ring opening and/or a proton migration. As a rule, the length of the dye F, in its preferred direction, is at least 10 Å. Examples which might be mentioned of bridging groups —A'— which can undergo geometric isomerization are the following:

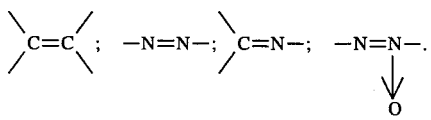

In particular, the dyes F contain such groups, wherein two aromatic rings or ring systems are joined by a bridging group —A'—. Thus suitable isomerizable derivatives are: azobenzene, azoxybenzene, azomethine, etc. The dyes F also advantageously contain substituents which are per se known and which determine the absorption characteristics of the individual dyes (in this connection, see DE 39 24 554, pp. 5–7). In particular azo dyes are preferred. Their structures are described in detail in DE 39 24 554. The following prototypes for the dyes F might be mentioned in particular, wherein optional substituents may be present in one or more of the 2-, 3-, 5-, and 6-, and the 2'- 3'- 5'- and 6'-positions:

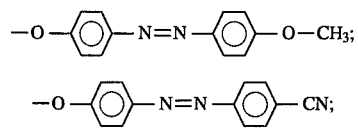

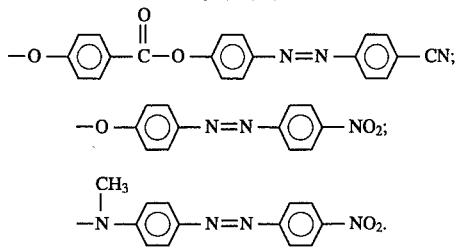

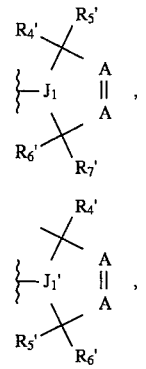

Suitable substituents include $C_{1-6}$ alkyl, halogen, —CN, $C_{1-6}$ alkoxy, $C_{1-6}$alkylCO—, and $C_{1-6}$alkylO$_2$C—.

The above structural elements (e.g. linked at a position provided for a substitution) may function as color-conferring structural elements Z".

Co-monomers are employed as additional monomeric units for the LC poly(meth)acrylates PP, which co-monomers have substituents which can form thermally reversibly, cleavable covalent bonds with themselves or with other substituents and/or with low molecular weight additives. Preferably these comonomers are present in the LC poly(meth)acrylate PP in amounts of from 0.1–15 mol %, particularly preferably 1–10 mol %. The comonomers may preferably be those represented by formula I

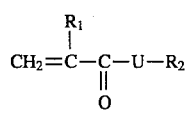
                I where U is O, S, or NH;

$R_1$ is hydrogen or methyl; and $R_2$ represents —X—$R_3$,
   where X is —(CH$_2$)$_n$— or —(O—CH$_2$)$_n$—, and n is an integer of 1–6, and $R_3$ represents (formula Ia):

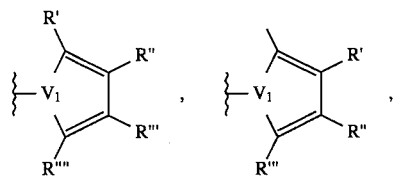

where $V_1$ represents CH;
  R', R", R-'", and R"" each independently represents hydrogen or an n-$C_{1-6}$alkyl; and
  $V_1$' represents O, S, or CH$_2$;
and/or $R_3$ represents (formula Ib):

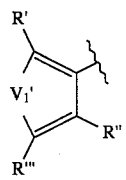

where A is N or CH;

$J_1$ is N or CH;

$R_4$', $R_5$', $R_6$', and $R_7$' each independently is hydrogen, CN, or halogen;

$J_1$' is O, S, NH, or CH$_2$;

A" is C; and $R_1$', $R_2$', and $R_3$' each independently is hydrogen, halogen, carboxyl, or a carboxylate ester. Suitable diene-containing co-monomers of formula Ia are:

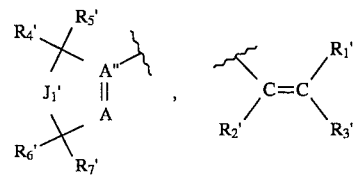

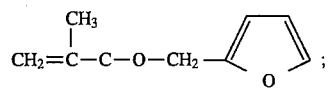

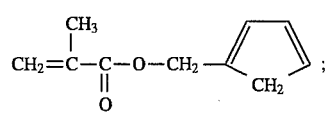

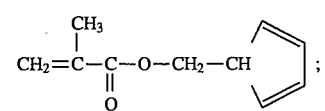

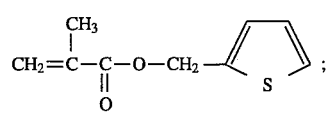

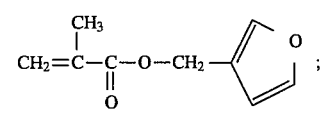

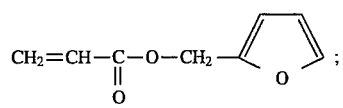

Suitable dienophilic comonomers of formula Ib are:

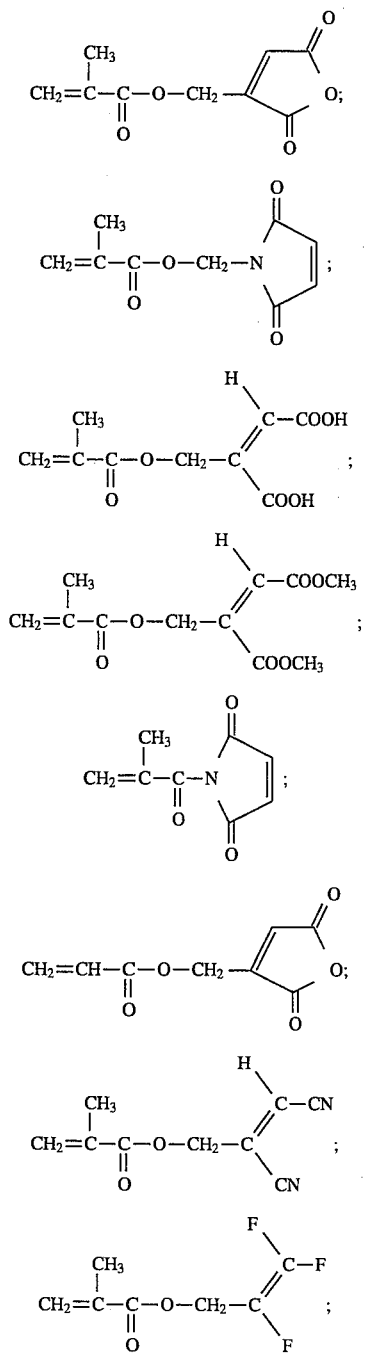

The comonomers of formula Ia can react with those of formula Ib in a Diels-Alder reaction with formation of bonds which are thermally unstable and thus thermally reversibly cleavable. At the same time, thermally reversibly cleavable crosslinking points between the LC poly(meth)acrylate molecules are formed.

These crosslinking points are also formed if low molecular weight compounds of formulas IIa to IIc which contain at least two diene-containing substituents form thermally reversibly cleavable bonds with poly(meth) acrylates PP, which PP contains dienophilic comonomers of formula Ib, in Diels-Alder reactions, according to the following scheme:

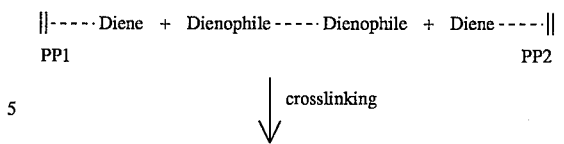

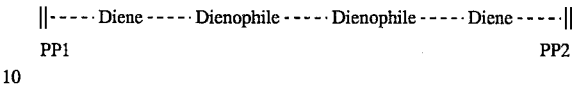

This also applies for the formation of crosslinking points between poly(meth)acrylates PP which have diene-containing comonomers of formula Ia, with the aid of low molecular weight compounds of formulas IId–IIf having at least two dienophilic substituents. However, it is understood that diene-containing poly(meth)acrylates are crosslinked by low-molecular weight compounds bearing two dienophile substituents and dienophile containing poly(meth) acrylates are crosslinked by low molecular weight compounds bearing two diene substituents.

The mechanism of the crosslinking and its thermal reversibility are described in DE 41 04 319.7. Also, Stevens, M. P., and Jenkins, A. D., 1979, *J. Polym. Sci., Polym. Chem. Ed.*, 17, 3675, describe the crosslinking of polystyrene via: maleimide groups (which are dienophiles) connected to the polystyrene, and the bifunctional diene difurfuryl adipate. The above-mentioned low molecular weight compounds of formulas IIa to IIf have molecular weights $\overline{Mw} \leq 2,000$ gms/mol, preferably 1,000–1,500 gms/mol and have at least two diene-containing or dienophilic substituents. As diene components IIa-c are

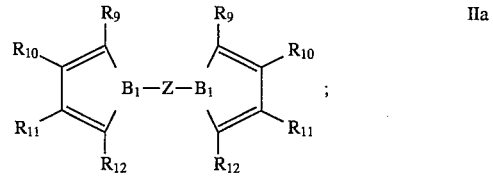

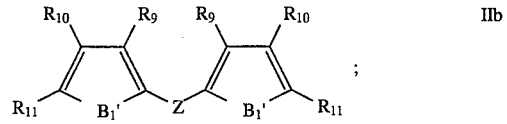

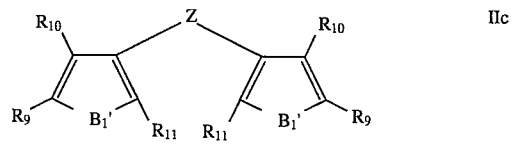

where $B_1$ is CH;

$B_1'$ is $CH_2$, O, or S;

$R_9$, $R_{10}$, $R_{11}$, and $R_{12}$ each independently is hydrogen or an $C_{1-16}$ n-alkyl group; and Z is an aliphatic and/or aromatic group with 4–30 C atoms, which group also may contain additional hetero atoms and/or hetero atom groups; further as dienophilic components IId–f are

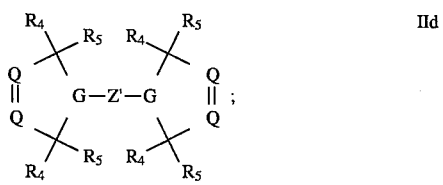

-continued

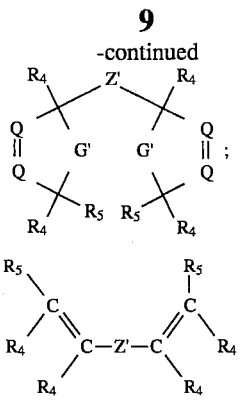

where G is N or CH;
G' is NH, O, S, or CH$_2$;
Q is N or CH;
R$_4$ and R$_5$ each independently is hydrogen, CN, or halogen; and
Z' represents an aliphatic and/or aromatic group with 4–30 C atoms, which also may contain additional hetero atoms and/or hetero atom groups.

The following diene-containing compounds of formulas IIa–IIc are representative but not limiting of the present invention:

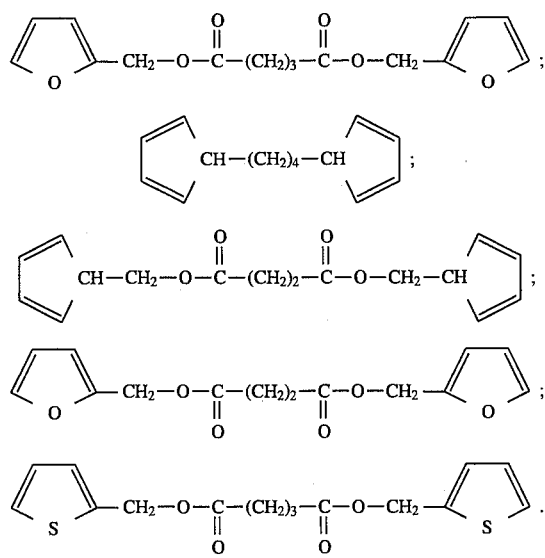

The following dienophile-containing compounds of formulas IId–IIf are representative but not limiting of the present invention:

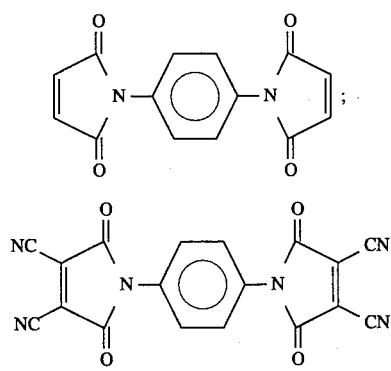

-continued

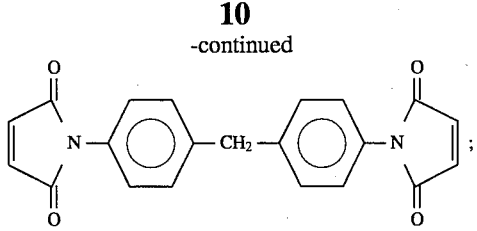

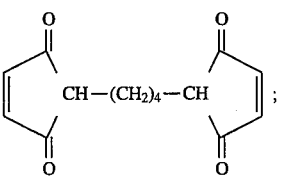

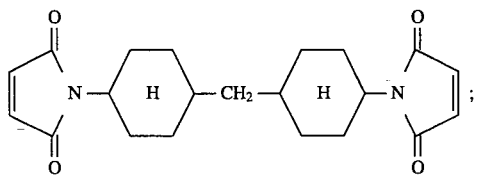

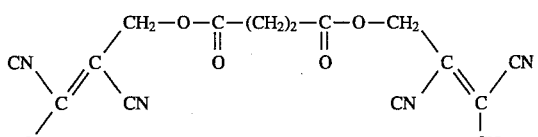

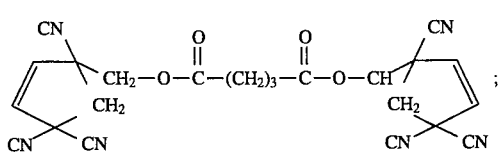

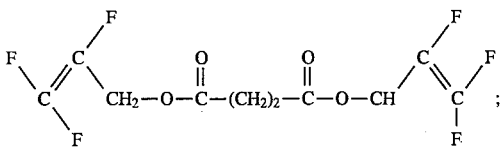

Kennedy, J. P., et al., 1979, *Polym. Sci., Polym. Chem. Ed.*, 17, 2055, describe cyclopentadiene-group-containing polyolefins which crosslink via intermolecular Diels-Alder condensations of the cyclopentadienyl groups. Also, LC poly(meth)acrylates wherein the only comonomer units are those containing cyclopentadiene substituents are also capable of crosslinking in this manner. However, because of the equilibrium which prevails even at relatively high temperatures, between cycloaddition and cycloreversion, the crosslinking is not completely thermally reversible.

The LC poly(meth)acrylates PP comprised of monomer units of groups I and II have a T$_g$ in the crosslinked state of ≧40° C., preferably between 50° and 80° C. (For determination of the T$_g$, see Mark, H. F., et al., 1989, "Encyclopedia of Polymer Science and Engineering", 2nd Ed V. 7 pub. J. Wiley & Sons, pp. 531–544.) The amount of low molecular weight crosslinking component, which can be added to poly(meth)acrylates PP may vary depending on the nature of the poly(meth)acrylates PP, provided that, in the crosslinked state, the T$_g$ is ≧40° C., preferably 50°–80° C. Suitable amounts may be from 0.2–30 wt. %, preferably 1–10 wt. % based on the amount of poly(meth)acrylates PP. The inventive un-crosslinked polymers PP have mean molecular weights Mw (in grams per mole), determined, e.g., with the aid of gel permeation chromatography or the light scattering method, of between 5,000 and 500,000 gram/mol, preferably between 20,000 and 250,000 gram/mol, and particularly preferably between 40,000 and 150,000 gram/mol.

The inventive polymers PP comprise units of monomers of formulas I and III, and the mixtures of polymers PP with lower molecular weight compounds according to formula II, are intended to be processed from the melt or from concentrated solutions, to produce homogeneous films. The content of the polymers PP, or their mixtures with compounds of formula II, in suitable solvents LM is in the range 10–90 wt. %, preferably between 30 and 60 wt. %. Particularly suitable materials for use as the solvents LM are relatively polar solvents and solvent mixtures, advantageously with boiling points which are not excessively low but with the capability of being removed by simple means, e.g. evaporation. Particularly suitable are solvents which can also serve as media for the polymerization in solution. On principle such solvents are oxygen-containing solvents such as dioxane, tetrahydrofuran, methyl ethyl ketone, cyclopentanone, and cyclohexanone; halogenated hydrocarbons such as chloroform, dichloromethane, and trichloroethane; esters such as butyl acetate and ethylene glycol acetate; and cyclic carbonates or lactones, such as ethylene carbonate; such that a minimum boiling temperature of 40° C. is maintained under normal conditions.

The poly(meth)acrylates PP can be produced by polymerization methods of the state of the art (in this connection, see Rauch-Puntigam, H., and Voelker, Th., 1967, "Acryl- und Methacrylverbindungen", pub. Springer-Verlag).

As polymerization initiators are the initiators which are per se known, particularly azo compounds and peroxy compounds, particularly the organic-soluble initiators used in solution polymerization. The temperature dependence of the initiator effectiveness should be coordinated with the properties of the solvent LM, particularly the boiling point of the solvent (see Mark, H. F., et al., 1989, "Encyclopedia of Polymer Science and Technology", 2nd Ed V. 15 pub. J. Wiley, pp 402–418). One might mention, e.g., azoisobutyronitrile, tert-butyl peroctoate, benzoyl peroxide, tert-butyl perpivalate, etc. The concentration of the initiator is in the usual range of 0.01–2 wt. % (based on the weight of the monomers).

Also molecular weight regulators or chain propagation regulators may be added for the polymerization, in amounts of 0.1–5 wt. % (based on the weight of the monomers) (see Rauch-Puntigam and Voelker, loc. cit.). Particular molecular weight regulators which may be used are mercaptans, such as butyl mercaptan, tert-dodecyl mercaptan, or polyfunctional mercaptans having 2–6 SH groups. Also, halogen-containing compounds such as tetrachloromethane or benzyl bromide may be used as molecular weight regulators. Preferred are regulators capable of terminating the growing polymer chain with a hydrogen atom. In solution polymerization usually molecular weight regulators are not necessarily used.

The polymerization temperature in solution polymerization depends on the solvent, e.g. when the polymerization is carried out under reflux the temperature is generally in the range 20°–100° C., particularly 40°–80° C. The duration of polymerization is preferably between 12 and 36 hr. In polymerization in the mass to produce the poly(meth)acrylates PP, the monomers are polymerized in a plastic bag in a water bath at 20°–90° C., particularly 30°–70° C., with duration 6–72 hr, preferably 12–48 hr.

The LC poly(meth)acrylate PP may be processed to form films, from solution or from the melt. Alternatively it may be precipitated from solution using a non-solvent, possibly followed by drying and if necessary redissolution, with further processing from the new solution.

The films can be produced by conventional methods such as by applying a solution containing the polymers PP, or (containing) a mixture comprised of the polymers PP and low molecular weight crosslinking agents of formula II, onto a support. The application may be by means of, e.g., doctoring, immersion, spin-coating, etc. Then the solvent is removed, e.g. by evaporation, followed by drying in a drying cabinet. During the process, the thermally reversible crosslinking points are formed by the cycloaddition of dienes (comonomers of formula Ia and/or low molecular weight compounds of formulas IIa and IIc) and dienophiles (comonomers of formula Ib and/or low molecular weight compounds of formula IId to IIf), thereby forming covalent links between the polymer molecules. In a second step the crosslinked polymer film is stretched, at ca. 5° K. below the clear temperature $T_n$i distinctly below the temperature at which the crosslinking points between the LC poly(meth)acrylate polymers reversibly release. In addition, tempering may be carried out prior to the stretching, at 10°–20° K. below $T_n$i, for a duration of, e.g., 5 min to 5 hr, depending on the film thickness and the degree of crosslinking.

The degree of stretching, $\alpha$, where $\alpha=(1-l_o)l_o$ is between 50% and 300%, preferably >100%, more preferably 120–200%. Following the stretching the sample is slowly cooled to room temperature at 10° K./min. The degree of orientation achieved can be determined at room temperature by UV-visible or IR spectroscopy.

Another advantageous embodiment for producing reversibly crosslinked anisotropically oriented LC polymer films is production from a melt comprising the LC poly(meth)acrylates PP or comprising a mixture of the polymers PP and low molecular weight crosslinking agents of formula II. The melt is extruded at 220°–280° C., preferably 240°–250° C., most preferably 240° C., through a slit nozzle with an exit slit of 0.1–2 mm, and is processed to provide a film with thickness 0.1–1 mm, by calendaring on a calendar roll apparatus with roll temperatures 50°–100° C., preferably 80°–90° C. In the course of cooling on the calendar rolls the thermally reversible crosslinking points form, so that the polymer molecules in the resulting film are covalently crosslinked. The orientation of the film is carried out as described above, by stretching at a temperature 5° K. below $T_n$i and distinctly below the temperature at which the crosslinking points between the polymers PP reversibly release (i.e. the temperature of cycloreversion).

It is also possible to carry out orientation of the polymers PP prior to and/or during the crosslinking, if the roll surfaces of the calendaring apparatus are structured such that the polymers PP are oriented at the time of application onto the roll surface, wherewith simultaneously and/or thereafter (depending on the cooling of the polymer composition on the roll surface) the thermally reversible crosslinking points between the polymer molecules are formed. Also, the polymers PP can be oriented in the melt prior to and/or during the crosslinking, on support materials structured as desired, wherewith the cooling temperatures must be chosen such that the orientation takes place prior to the crosslinking.

The immediate advantage of the inventive method is the production of films comprised of thermally reversibly crosslinked, oriented LC poly(meth)acrylates PP wherein the orientation can be carried out with the use of a structured support material and/or by stretching to degrees of stretching of >100%. The thermally reversible crosslinking of the film makes possible multiple thermoplastic processing, wherein, in each processing, the orientation of the LC units can be newly conferred. The orientation of the LC polymers can be accomplished over a wide range of film thicknesses, even without the use of a structured support material.

The inventive films are well suited for a number of applications, e.g.

- optical information storage, particularly reversible digital and holographic data storage,
- as optical components, and
- in nonlinear optics.

The inventively produced materials are further suited for surface coatings, laminates, or bonded systems with special anisotropic properties. Thus, defined optical path differences can be set up via the film thickness, the orientation, and the resulting birefringence, which path differences are suitable for applications such as, e.g. regulation of polarization, production of anti-glare coatings for large-surface displays, etc. In nonlinear optics the reversibly crosslinked, oriented poly(meth)acrylates PP may be used for imparting polarizing characteristics to chromophores with nonlinear optical properties.

Having generally described this invention, a further understanding can be obtained by reference to certain specific examples which are provided herein for purposes of illustration only and are not intended to be limiting unless otherwise specified.

EXAMPLES

The following Examples serve to illustrate the invention. The following monomers, as exemplars of the respective monomer classes to which they belong, were used for producing the polymers PP:

Monomers of formula III:

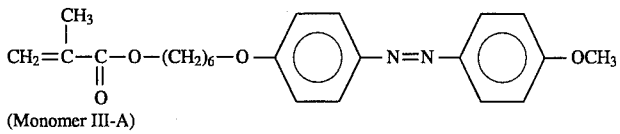
(Monomer III-A)

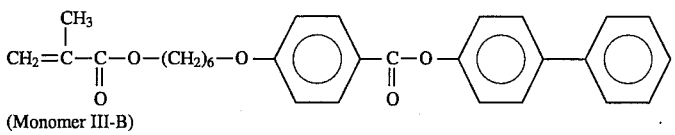
(Monomer III-B)

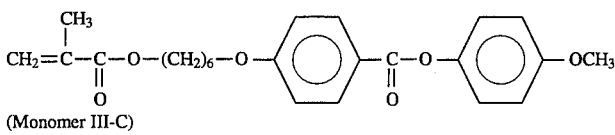
(Monomer III-C)

Monomer of formula I: (formula I-A):

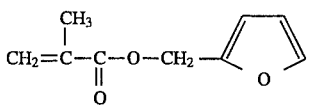

Compound of formula II: (compound II-A):

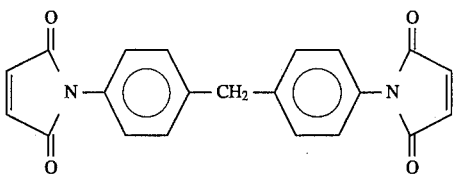

Example 1

A. Polymerization of the liquid crystalline polymers PP1:

In a 250 ml three-necked flask with a gas inlet, reflux condenser, and mechanical stirrer, 58.7 g (142 mmol) of monomer III-C and 1.25 g (7.5 mmol) monomer I-A were dissolved in 180 ml toluene at room temperature. After addition of 24.5 mg (0.1 mol %, based on the monomers present) 2,2'-azobis(isobutyronitrile), oxygen was removed from the reaction mixture by application, for three brief periods, of vacuum from an aspirator, and polymerization was carried out for 22 hr at 70° C. under an argon atmosphere. After completion of the polymerization, the solution was subjected to precipitation in 1 l methanol under stirring. This procedure was repeated until no more residual monomer could be detected by monitoring by thin layer chromatography. Then drying was carried out for 3 days, at 60° C. in a vacuum drying cabinet. The result was the LC polymer of formula PP1:

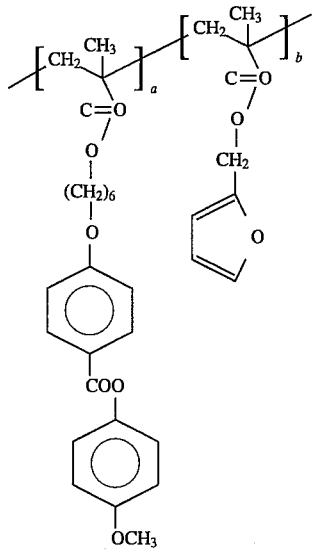

where a+b=100 mol %, a=95 mol %, and b=5 mol %. The yield was 8.5 g (14.1% of theoretical).

Characterization:
Mn=82,900 g/mol $T_g$=33° C.
U=1.34 $T_n i$=97° C.

The molecular weights were determined by SEC (size exclusion chromatography), using a PMMA calibration curve in THF at 25° C. The data for $T_g$ and $T_n i$ (clear temperature) are based on DSC (differential scanning calorimetry) determined from the "onset" of the second heating curve (20° K./min).

B. Film preparation, and crosslinking of the liquid crystalline polymers PP1:

A solution of 8.1 g of polymer PP1 and 180 mg of the compound of formula II-A (hereinafter referred to as "the bismaleimide") in 20 ml dichloromethane was filtered to remove dust, using a 0.25 µm TEFLON brand of polytetafluoroethylene filter (supplied by Millipore). Using a 200 µm doctor apparatus, films with a defined film thickness were produced from this solution on silanized glass plates (25×25 cm), and were dried for 6 hr at room temperature followed by 12 hr at 50° C. The soluble fraction extracted with toluene was 5.8%. The degree of swelling with toluene at room temperature was 37 units.

C. Stretching and optical characterization of the crosslinked liquid crystalline polymers PP1:

Test bodies 40×10 mm were cut from the crosslinked LC films described in (B.) supra, and were mechanically stretched under defined conditions.

a. The test bodies were heated to a temperature of 95° C. and were stretched 95% at this temperature ($\alpha=(1-1_o)/1_o=$ 95%). Then, the clear, transparent test bodies were characterized under a polarization microscope under crossed polarizing filters in transmitted light. The intensities $I_{\parallel}$ (parallel to the polarizer) and $I_{45°}$ (at a 45° angle to the polarizer) were recorded with the aid of a photocell and used for determining the macroscopic orientation of the LC stretched polymers. The degree of macroscopic orientation effectiveness MOE (%) is given by the following formula:

$$MOE\ (\%)=((I_{\parallel}-I_{45°})/I_{\parallel})°100$$

Then, installing and using a heated microscope table, the clear temperature $T_n i$ was determined, employing a heating rate of 10° K./min.

MOE=95%. $T_n i$=91° C.

b. As with method (a.), supra, the test bodies were heated to 95° C., but here they were then stretched to $\alpha$=107%, at 90° C. The characterization was carried out analogously to that with method (a.). Result:

MOE=66%. $T_n i$=91° C.

Example 2:

A. Polymerization of the liquid crystalline polymer PP2:

In the apparatus described in Example 1, and under the same conditions, 48.9 g (123.4 mmol) of monomer III-A and 1.08 g (6.5 mmol) of monomer I-A were dissolved in 100 mol absolute dioxane. Oxygen was removed from the solution, and, after addition of 213 mg 2,2'-azobis(isobutyronitrile), polymerization was carried out 22 hr at 70° C. under an argon atmosphere. The subsequent procedure was as described in Example 1. The LC polymer obtained had the formula

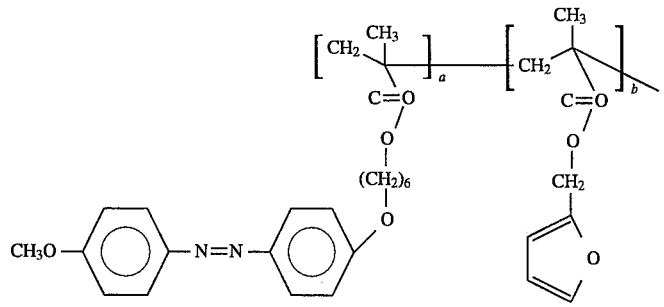

where a+b=100 mol %, a=95 mol %, and b=5 mol %. The yield was 40.2 g (80.4% of theoretical).

Characterization:
Mn=46,400 g/mol $T_g$=61° C.
U=2.42 $T_n i$=127° C.

The analytical data was obtained according to Example 1A.

B. Film preparation and crosslinking of the LC polymer PP2:

10 g of the polymer PP2 and 0.23 g of the bismaleimide were dissolved and the solution was filtered to remove dust, both procedures as described in Example 1. The film preparation technique was also analogous to that of Example 1. The rectangular sample bodies with film thickness 45±6 µm, length 400 mm, and width 100 mm, were tempered 12 hr at 70° C. and were then stretched 68% ($\alpha$=68%) at 120° C.

$T_g$=61° C. $T_n i$=118° C.

C. Stretching and optical characterization:

The stretching was described supra (B.); the characterization was carried out as in Example 1.

MOE=77%. $T_n i$=117° C. (by polarization microscopy).

Example 3

A. Polymerization of the liquid crystalline polymer PP3:

58.8 g (129.5 mmol) of monomer III-B and 1.13 g (6.8 mmol) of monomer I-A were dissolved in 180 mol absolute dioxane, and polymerized with 0.448 g of 2,2'-azobis(isobutyronitrile) and further processing were carried out as in Example 2. The result was the LC polymer PP3, of formula

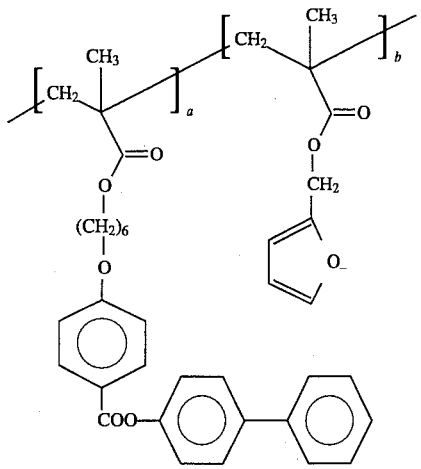

where a+b=100 mol %, a=95 mol %, and b=5 mol %. The yield was 57.3 g (95.5% of theoretical).

Characterization:

Mn=45,000 g/mol $T_g$=40° C.

U=5.9 $T_n i$=110° C.

The analytical data was obtained as in Example 1A.

B. Film preparation, and crosslinking:

10 g of the polymer PP3 and 0.21 g of the bismaleimide were dissolved in 10 ml dichloromethane, with further processing as described in Example 1. The result was films with thickness 43±6 µm. The films were then tempered for 12 hr at 50° C.

C. Stretching and characterization of the crosslinked polymers PP3:

The test bodies as described in Example 1 were heated to 110° C., and after c. 5 min were stretched at 105° C. Characterization was by polarization microscopy as per Example 1. The transparent, clear films had the following characteristics:

Test a: Elongation 100%, MOE 94%, $T_n i$ 103° C.
Test b: Elongation 71%, MOE 96%, $T_n i$ 103° C.

Example 4

A. Polymerization of the liquid crystalline polymer PP4:

0.9 g (2.3 mmol) of monomer III-A, 97.2 g (214 mmol) of monomer III-B, and 1.89 g (11.3 mmol) of monomer I-A were subjected to polymerization and further processing as described in Example 2, except that the reaction mixture was charged to a 500 ml flask, with 300 ml dioxane used as a solvent. Repeated precipitation in 2 l methanol was carried out. The result was the LC prepolymer P'P'4 of formula:

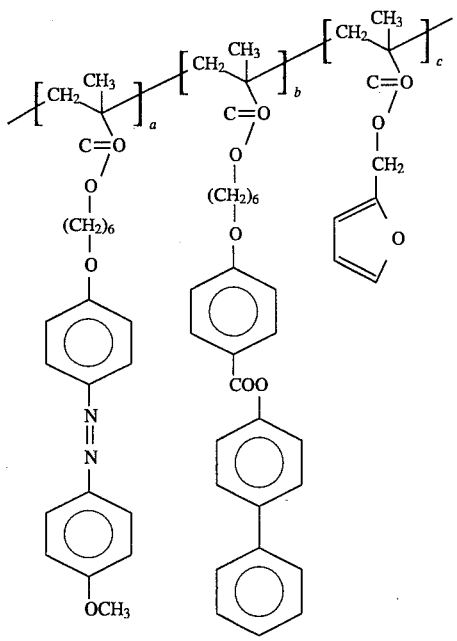

where a+b+c=100 mol %, a=1 mol %, b=94 mol %, and c=5 mol %. The yield was 96.3 g (96.3% of theoretical).

Characterization:

Mn=99,300 g/mol $T_g$=59° C.

U=6.5 $T_n i$=109° C.

The analytical data was obtained as in Example 1A.

B. Film preparation, and crosslinking of the liquid crystalline polymer PP4:

90 g of the polymer PP4 and 1.85 g of the bismaleimide were dissolved in 300 ml dichloromethane and the solution was filtered and processed further as described in Example 1, to produce films. The extractable residue was about 5–7% by weight. The film thickness was 110±10 µm. The test bodies were 100 mm long and 10 mm wide.

C. Stretching and optical characterization of the crosslinked polymer PP4:

In a departure from the methods of the preceding Examples, the test bodies were stretched in the thermostatic chamber of a "Zwick 1474" tensile stretching apparatus. The bodies were heated briefly to 110° C. and stretched at T=105° C. α=350%.

For 105° C., MOE was 70% and $T_n i$ was 100° C.

Also the dichroic ratio S was determined to be S=−0.38, by W-visible spectroscopy,
where $S=(E_{||}-E_\perp)/(E_{||}+2E_\perp)$, where $E_{||}$ is the extinction at 400 nm, measured parallel to the stretching direction; and $E_\perp$ is the extinction at 400 nm, measured perpendicularly to the stretching direction.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An anisotropic liquid crystalline (LC) polymer film, comprising a reversibly crosslinkable LC poly(meth)acrylate, wherein said reversibly crosslinkable LC poly- (meth)acrylate in the crosslinked state has a $T_g \geq 40°$ C.

2. The anisotropic liquid crystalline (LC) polymer film of claim 1, wherein said reversibly crosslinkable LC poly(meth)acrylate comprises:

0.1–15 mol % (based on the total amount of monomers), of comonomer units of formula I:

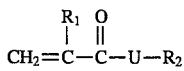  (I)

where U is O, S, or NH;

$R_1$ is hydrogen or methyl; and $R_2$ is —X—$R_3$, where X is —$(CH_2)_n$— or —$(O—CH_2)_n$—, and n=an integer from 1 to 6, and $R_3$ is (formula Ia):

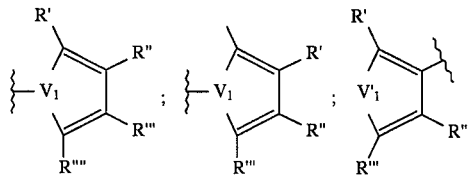

were $V_1$=CH;

R', R", R''', and R'''' each independently is hydrogen or an n-alkyl having 1–6 C atoms; and $V_1$=O, S, or CH2;

or $R_3$ represents (formula Ib):

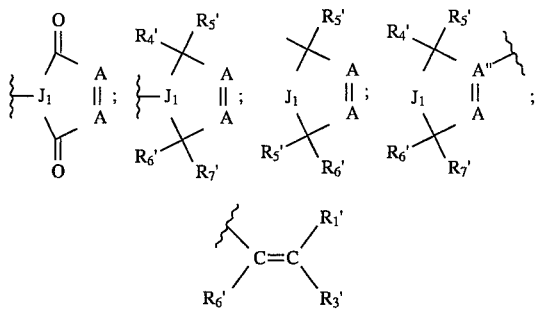

where A=N or CH;

$J_1$ represents N or CH;

$R_4'$, $R_5'$, $R_6'$, and $R_7'$, each independently is hydrogen, CN or halogen;

$J_1'$ represents O, S, NH, or $CH_2$;

A" represents C; and $R_1'$, $R_2'$, and $R_3'$ each independently is hydrogen, CN, halogen, carboxyl, or a carboxylate ester.

3. A multilayer laminate comprising the anisotropic liquid crystalline polymer film of claim 1.

4. The anisotropic liquid crystalline (LC) polymer film of claim 2, wherein said reversibly crosslinkable LC poly(meth)acrylate further comprises, monomer units of formula III:

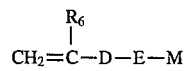

where $R_6$ is hydrogen or methyl;

D is —COO— or —CONR1"—, where R1" is H or a $C_{1-4}$ alkyl group;

E is a spacer unit with 1–14 chain members; and

M is a mesogenic group;

5. The anisotropic liquid crystalline polymer film of claim 2, wherein the $T_g$ in the crosslinked state is $\geq 40°$ C.

6. The multilayer laminate of claim 3 comprising a plurality of liquid crystalline polymer films.

7. The multilayer laminate of claim 3, wherein the polymer film itself serves as a substrate for an oriented surface layer.

8. The multilayer laminate of claim 6, wherein the individual layers of films have different preferred orientations, colors, monomers, and layer thicknesses.

9. An anisotropic liquid crystalline (LC) polymer film comprising:

a) 70–99.8 wt. % of a reversibly crosslinkable LC poly(meth)acrylate wherein said poly(meth)acrylate comprises i) 85–99.9 mol % of monomer units of formula III:

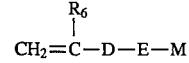

where $R_6$ is hydrogen or methyl;

D is —COO— or —CONR1"—, where R1" is H or a $C_{1-4}$ alkyl group;

E is a spacer unit with 1–14 chain members; and

M is a mesogenic group; and ii) 0.1–15 mol% of monomers of formula I

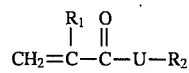  (I)

where U is O, S, or NH;

$R_1$ is hydrogen or methyl; and $R_2$ is —X—$R_3$, where

X is —$(CH_2)_n$— or —$(O—CH_2)_n$—, and n=an integer from 1 to 6, and $R_3$ is formula Ia:

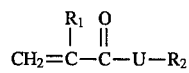  (I)

were $V_1$=CH;

R', R", R''', and R'''' each independently is hydrogen or an n-alkyl having 1–6 C atoms; and $V_1'$=O, S, or $CH_2$;

or $R_3$ represents formula Ib:

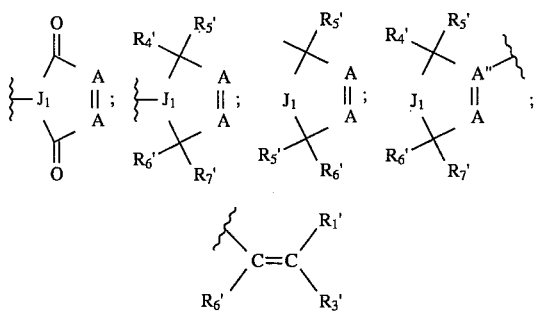

where A=N or CH;

$J_1$ represents N or CH;

$R_4'$, $R_5'$, $R_6'$, and $R_7'$ each independently is hydrogen, CN, or halogen;

$J_1'$ represents O, S, NH, or $CH_2$;

A" represents C; and $R_1'$, $R_2'$, and $R_3'$ each independently is hydrogen, CN, halogen, carboxyl, or a carboxylate ester; and b) 0.2–30 wt. % of a compound selected from the group consisting of the compounds of formulas IIa–IIf below:

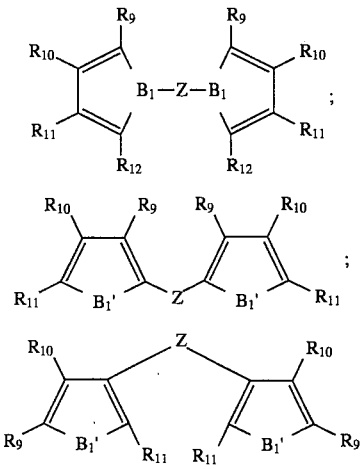

IIa

IIb

IIc where $B_1$ is CH;

$B_1'$ represents $CH_2$, O, or S;

$R_9$, $R_{10}$, $R_{11}$, and $R_{12}$ each independently is hydrogen or an n-alkyl group with 1–6 C atoms; and Z is a $C_{4-30}$ aliphatic, or $C_{4-30}$ aromatic group, which also may contain additional hetero atoms or hetero atom groups; and

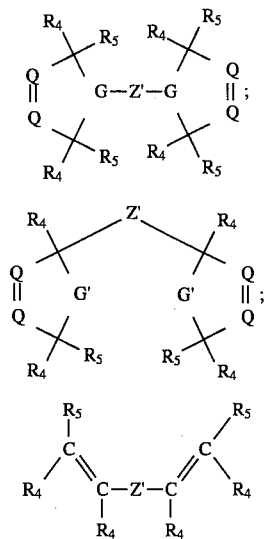

IId

IIe

IIf where G represents N or CH;

G' represents NH, O, S, or $CH_2$;

Q represents N or CH;

$R_4$ and $R_5$ each independently is hydrogen, CN, or halogen; and

Z' is a $C_{4-30}$ aliphatic or $C_{4-30}$ aromatic group, which also may contain additional hetero atoms or hetero atom groups.

10. A method of manufacturing an anisotropic LC polymer film of a reversibly crosslinked LC poly(meth)acrylate comprising:

i) forming a film of an LC poly(meth)acrylate wherein said LC poly(meth)acrylate comprises comonomer units which have thermally reversibly crosslinkable groups, which comonomers are present in amounts of 0.1–15 mol % based on the total amount of monomers.

11. The method of claim 10; wherein said LC poly(meth)acrylate comprises, in amounts of 0.1–15 mol %, based on the total amount of monomers, comonomer units of formula I:

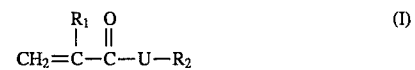

where U is O, S, or NH;

$R_1$ is hydrogen or methyl; and $R_2$ is —X—$R_3$, where X is —$(CH_2)_n$— or —$(O—CH_2)_n$—, and n=an integer from 1 to 6, and $R_3$ is (formula Ia):

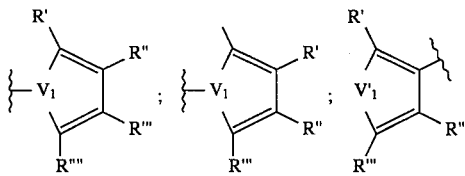

were $V_1$=CH;

R', R'', R''', and R'''' each independently is hydrogen or an n-alkyl having 1–6 C atoms; and $V_1'$=O, S, or CH2;

or $R_3$ represents (formula Ib):

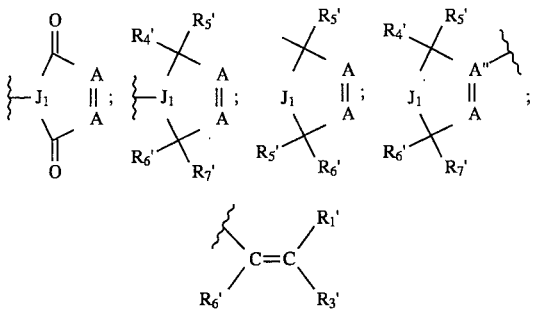

where A=N or CH;

$J_1$ represents N or CH;

$R_4'$, $R_5'$, $R_6'$, and $R_7'$ each independently is hydrogen, CN, or halogen;

$J_1'$ represents O, S, NH, or $CH_2$;

A'' represents C; and $R_1'$, $R_2'$, and $R_3'$ each independently is hydrogen, CN, halogen, carboxyl, or a carboxylate ester.

12. The method of claim 10; wherein the film formation from a solution of the thermally reversibly crosslinkable poly(meth)acrylate is carried out in an organic solvent.

13. The method of claim 10; wherein said LC poly(meth)acrylate undergoes orientation before any crosslinking.

14. The method of claim 10; wherein a melt comprising the LC poly(meth)acrylate is crosslinked by cooling and is processed to form a solid film, which film can undergo orientation prior to and/or following the crosslinking.

15. The method of claim 10; wherein the preferred orientation of the mesogen in the polymer film is changed by the stretching direction.

16. The method of claim 10; wherein the crosslinking of the poly(meth)acrylate is eliminated by tempering.

17. The method of claim 10; wherein said poly(meth)acrylate further comprises monomers of formula III:

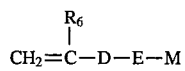

III where $R_6$ is hydrogen or methyl;

D is —COO— or —CONR1"—, where R1" is H or a $C_{1-4}$ alkyl group;

E is a spacer unit with 1–14 chain members; and

M is a mesogenic group;

wherein the contents of said comonomer with thermally reversibly crosslinkable groups and monomer III, and additional radically copolymerizable monomer units in the amount of 0–10 wt. %, altogether add up to 100 wt. %.

18. The method of claim 10; wherein a solution of said LC poly(meth)acrylate is converted to film form from the solution by removing the solvent and crosslinking the poly-(meth)acrylate by tempering, following which the crosslinked polymers are oriented by stretching at temperatures between $T_g$ and the clearing temperature $T_n i$.

19. The method as claimed in claim 10, wherein said comonomers are present in amounts of 1–10 mol %.

20. The method as claimed in claim 11, wherein said LC poly(meth)acrylate comprises, in amount of 1–10 mol %, comonomers of formula I.

21. The method of claim 11; wherein said polymer film comprises a thermally reversibly crosslinkable mixture, comprised of:

A) an LC poly(meth)acrylate according to claim 3, in the amount of 70–99.8 wt. %; and B) a compound of formulas IIa–IIf, in the amount of 0.2–30 wt. %:

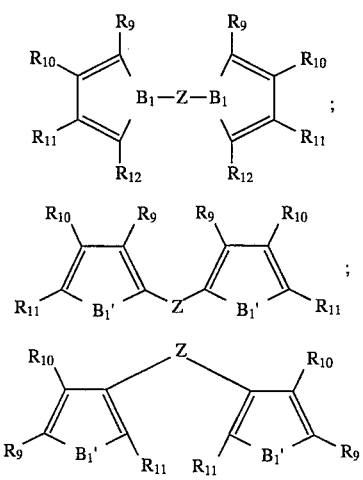

where $B_1$ is CH;

$B_1'$ represents $CH_2$, O, or S;

$R_9$, $R_{10}$, $R_{11}$, and $R_{12}$ each independently is hydrogen or an n-alkyl group with 1–6 C atoms; and Z is a $C_{4-30}$ aliphatic, or $C_{4-30}$ aromatic group, which also may contain additional hetero atoms or hetero atom groups; and

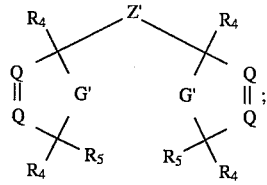

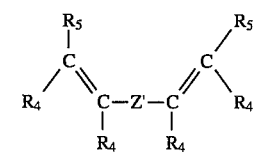

where G represents N or CH;

G' represents NH, O, S, or $CH_2$;

Q represents N or CH;

$R_4$ and $R_5$ each independently is hydrogen, CN, or halogen; and

Z' is a $C_{4-30}$ aliphatic or $C_{4-30}$ aromatic group, which also may contain additional hetero atoms or hetero atom groups.

22. The method of claim 12; wherein the boiling point of said solvent under standard conditions is at least 40° C.

23. The method of claim 16, wherein said tempering takes place at a temperature above the clear temperature, $T_n i$.

24. The method of claim 17; wherein solvents are employed which are a medium for the polymerization of monomers I and III.

25. The method of claim 20, wherein said tempering takes place at a temperature above the glass temperature, $T_g$.

26. The method of claim 21; wherein a solution of said mixture of poly(meth)acrylate and one or more compounds of foumula II is converted to film form from the solution by removing the solvent and crosslinking by tempering, following which the crosslinked polymers are oriented by stretching at temperatures between the glass temperature $T_g$ and the clearing temperature $T_n i$.

27. The method of claim 21; wherein said mixture of poly(meth)acrylate and one or more compounds of formula II, undergoes orientation, following which said mixture is crosslinked in the course of cooling, and processed to form a solid film.

28. The method of claim 21; wherein the melts comprising said mixture of poly(meth)acrylate and one or more compounds of formula II are crosslinked by cooling and are processed to form a solid film, which film can undergo orientation prior to and/or following the crosslinking.

29. The method of claim 21; wherein the crosslinking of said mixture of poly(meth)acrylate with bifunctional dienophilic compounds is eliminated by tempering.

30. The method of claim 21; wherein film formation from a solution of the thermally reversibly crosslinkable mixture of said poly(meth)acrylate and one or more compounds of formula II is carried out in an organic solvent.

31. The method of claim 21; wherein the glass temperature of said thermally reversibly crosslinkable mixture of poly(meth)acrylate and compounds of foumula II in the crosslinked state, is $T_g \geqq 40°$ C.

32. The method of claim 27, wherein said tempering takes place at a temperature above the glass temperature, $T_g$.

33. The method of claim 30, wherein said tempering takes place at a temperature above the clear temperature, $T_n i$.

34. The method of claim 30; wherein the boiling point of said solvent under standard conditions is at least 40° C.

35. A self-supporting anisotropic LC polymer film manufactured by the method of claim 10.

36. The polymer film of claim 35; wherein said film has a thickness between 1 and 1,000 μm, preferably between 10 and 200 μm.

* * * * *

UNITED STATES PATENT AND TRADEMARK OFFICE
CERTIFICATE OF CORRECTION

PATENT NO. : 5,489,451
DATED     : February 6, 1996
INVENTOR(S): Jurgen OMEIS, et al.

It is certified that error appears in the above-indentified patent and that said Letters Patent is hereby corrected as shown below:

On the title page, item [75], the third inventor's name should read:

--Karlheinz Goll--

Signed and Sealed this

Sixteenth Day of April, 1996

Attest:

BRUCE LEHMAN

Attesting Officer          Commissioner of Patents and Trademarks